United States Patent
Schulte

(10) Patent No.: US 8,241,532 B2
(45) Date of Patent: Aug. 14, 2012

(54) ACTINIDE/BERYLLIUM NEUTRON SOURCES WITH REDUCED DISPERSION CHARACTERISTICS

(75) Inventor: Louis D. Schulte, Los Alamos, NM (US)

(73) Assignee: Los Alamos National Security, LLc, Los Alamos, NM (US)

( * ) Notice: Subject to any disclaimer, the term of this patent is extended or adjusted under 35 U.S.C. 154(b) by 28 days.

(21) Appl. No.: 12/868,963

(22) Filed: Aug. 26, 2010

(65) Prior Publication Data

US 2011/0062397 A1 Mar. 17, 2011

Related U.S. Application Data

(60) Provisional application No. 61/242,237, filed on Sep. 14, 2009.

(51) Int. Cl.
*C09K 3/00* (2006.01)
*G21C 21/00* (2006.01)
*G21G 4/00* (2006.01)
*G21G 4/02* (2006.01)

(52) U.S. Cl. ........ 252/625; 252/638; 252/640; 252/643; 252/644; 252/645; 250/269.4; 250/269.5; 264/0.5; 378/119; 378/143

(58) Field of Classification Search .................. 252/625, 252/638, 640, 643, 644, 645; 250/269.4, 250/269.5; 264/0.5; 378/119, 143
See application file for complete search history.

(56) References Cited

U.S. PATENT DOCUMENTS

| | | | |
|---|---|---|---|
| 2,867,530 A | | 1/1959 | Coffinberry |
| 3,264,379 A | | 8/1966 | Hammer et al. |
| 3,310,676 A | * | 3/1967 | Haram, Jr. ............... 376/191 |
| 3,360,477 A | | 12/1967 | Acree et al. |
| 3,604,934 A | * | 9/1971 | Melillo et al. .............. 378/69 |
| 4,766,319 A | * | 8/1988 | Regimand ............... 250/390.05 |
| 7,436,932 B2 | | 10/2008 | Clayton |
| 2006/0291628 A1 | * | 12/2006 | Clayton ................... 378/143 |
| 2007/0241275 A1 | | 10/2007 | Guo et al. |

OTHER PUBLICATIONS

Notification of Transmittal of the International Search Report and the Written opinion of the International Searching Authority, or the Declaration issued on Oct. 25, 2010 for corresponding International Application PCT/US10/02485 filed on Sep. 14, 2010 (9 pages).

U. Benedict, Preparation and X-Ray Diffraction Study of PaBe13, AmBe13, and CmBe13, Journal of the Less-Common Metals, 1975, vol. 42, 345-354, Elsevier Sequoia S.A. Netherlands.

E. Johnson, Light-Weight Radioisotope Heater Unite Safety Analysis Report (LWRHU-SAR), Oct. 1985, V1, 1-96, Monsanto Research Corporation for DOE.

R. E. Honnell, Fabrication of Noble Metal Alloy Filter Vents for Radioisotope Thermal Generators, Jan. 1977, LA-6618-MS Informal Report, 1-7, Los Alamos Scientific Laboratory.

A. C. Fraker, Corrosion of Zircaloy Spent Fuel Cladding in a Repository, Jul. 1989, NISTIR 89-4414 Report, 1-21, US Dept. of Commerce, National Inst. Standards and Tech.

* cited by examiner

*Primary Examiner* — Joseph D Anthony

(74) *Attorney, Agent, or Firm* — Juliet A. Jones; Samuel L. Borkowsky

(57) ABSTRACT

Neutron source comprising a composite, said composite comprising crystals comprising BeO and $AmBe_{13}$, and an excess of beryllium, wherein the crystals have an average size of less than 2 microns; the size distribution of the crystals is less than 2 microns; and the beryllium is present in a 7-fold to a 75-fold excess by weight of the amount of $AmBe_{13}$; and methods of making thereof.

14 Claims, No Drawings

ACTINIDE/BERYLLIUM NEUTRON SOURCES WITH REDUCED DISPERSION CHARACTERISTICS

REFERENCE TO PRIOR APPLICATION

This application claims the benefit of priority to U.S. Provisional Patent Application 61/242,237, filed Sep. 14, 2009, and incorporated herein in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to composites comprising BeO and $AmBe_{13}$, in an excess of Be metal, having reduced dispersion characteristics and which are suitable for use in neutron sources, and methods of making thereof.

BACKGROUND OF THE INVENTION

Neutron sources are used in a variety of applications, including oil and natural gas exploration. Currently available commercial neutron sources contain finely divided powders comprising a radioactive material, e.g., $^{241}AmO_2$, and beryllium metal, which are mixed together to provide intimate contact between the materials. In natural gas and oil exploration, "logging" wells (i.e., determining characteristics such as density, porosity, and attenuation, among others) is an important step in predicting production potential. Logging may be performed by "wire line," in which the neutron source is placed in an open or cased hole, or alternatively logging may be performed while drilling, in which case the neutron source and detector(s) are placed on a special section of the drilling stem. In some instances, neutron sources may be lost or damaged during the process. In order to prevent accidental dispersion, the powdered material is encased in multiple welded capsules, however, the capsules are not always strong enough to prevent accidental dispersion. In addition, in recent years, concerns about intentional dispersion have increased. Whether accidental or intentional, once a powdered substance is dispersed, containment and cleanup become difficult (if not impossible) and expensive.

A need exists, therefore, for neutron sources which comprise an AnBe material which is less dispersible, and which provides a steady, reliable source of neutrons.

SUMMARY OF THE INVENTION

The present invention meets the aforementioned needs by providing a neutron source comprising a Be/BeO/$AmBe_{13}$ composite. The composite comprises crystals comprising BeO and $AmBe_{13}$, in an excess of Be metal. The composite is a solid monolith engineered for strength rather than a mixture of powders, and thus exhibits decreased dispersibility. The crystals have a size of less than 2 μm, and are monodisperse, meaning that the size distribution is narrow. These characteristics impart desirable qualities to the composite, including hardness and tensile strength which allow for more robust sources. The composite is obtained by a novel process which utilizes induction heating to perform rapid heating and cooling. The composite of the present invention is not easily dispersed, and allows for more efficient and complete cleanup in the event of an accident. The source of the present invention further is more efficient than currently available sources, which means that less $^{241}Am$ is required to achieve the same neutron output.

AmBe neutron sources provide a portable, tough, continuous, and reliable source of neutrons independent of a reactor or a neutron generator. $^{241}AmO_2$ and Be mixtures create a neutron source via an "alpha-N" reaction (shorthand representation $^9Be(\alpha,N)^{12}C$). $^{241}Am$ has a half-life of 432 years, and this relatively high specific activity provides good neutron source efficiency, useful neutron flux ranges, and steady neutron output for years in an AmBe source. Be has the highest neutron yield from $(\alpha,N)$ reaction of any element, although even Be does require many thousands of alpha particles to produce one neutron.

The following describe some non-limiting embodiments of the present invention.

According to one embodiment of the present invention, a neutron source comprising a composite is provided, said composite comprising crystals comprising BeO and $AmBe_{13}$, and an excess of beryllium, wherein the crystals have an average size of less than 2 microns; the size distribution of the crystals is less than 2 microns; and the beryllium is present in a 7-fold to a 75-fold excess by weight of the amount of $AmBe_{13}$.

According to another embodiment of the present invention, a neutron source comprising a composite is provided, said composite comprising crystals comprising BeO and $AmBe_{13}$ and an excess of beryllium, wherein the beryllium is present in a 7-fold to a 75-fold excess by weight of the amount of $AmBe_{13}$, and wherein the composite has a tensile strength of greater than 20,000 psi.

According to yet another embodiment of the present invention, a method of producing a composite is provided, said composite comprising crystals comprising BeO and $AmBe_{13}$ and an excess of beryllium, comprising providing Am metal and Be metal powder in a sealed capsule, wherein the weight ratio of the Be metal to the $AmO_2$ powder is from about 10:1 to about 100:1; heating the mixed Am metal and Be metal powder in an induction furnace to a temperature of from about 1400° C. to about 1600° C. for a period of about 5 minutes; and lowering the temperature below the freezing point of the composite within about 5 minutes.

DETAILED DESCRIPTION OF THE INVENTION

"AmBe," as used herein, refers to a generic term encompassing any material comprising $^{241}$americium and beryllium. "AmBe source," as used herein, means a neutron source comprising $^{241}$americium and beryllium.

"AnBe," as used herein, refers to a generic term encompassing any material comprising an actinide and beryllium.

"$^{241}AmBe_{13}$" or "$AmBe_{13}$," as used herein, mean an intermetallic compound comprising $^{241}$americium and beryllium.

"Be/BeO/$AmBe_{13}$," as used herein, means the composite material of the present invention, which comprises crystals comprising BeO and $AmBe_{13}$, and an excess of beryllium.

The present invention relates to an AmBe neutron source comprising a solid, metallic composite comprising small BeO and $AmBe_{13}$ crystals, which are uniformly dispersed in an excess of Be metal. Alpha particles (+2 charge) are emitted from the $^{241}Am$ nucleus with high energy, but travel only a very short distance through the electron clouds of neighboring atoms. The range of 5.5 MeV alpha particles in water is about 40 microns. The range of alpha particles in materials with greater electron cloud density is significantly less (e.g., about 20 microns in $^{241}AmO_2$). The alpha particle must retain enough energy to initiate the $^9Be(\alpha,N)^{12}C$ reaction when striking the Be nucleus to effect the nuclear reaction. Thus, smaller $^{241}AmO_2$ crystals result in more efficient utilization of alpha particles in AmBe sources.

The intermetallic compound $AmBe_{13}$ is very hard but also very brittle, and has a tensile strength limited to a few psi. Cast beryllium metal is light and far stronger than any of the intermetallic compounds or pressed powders found in existing source designs, with a typical tensile strength of about 15,000-20,000 psi. However, beryllium metal cast by traditional methods is a bit weaker, more brittle and less ductile than Be made from hot pressed powders, extrusion, or by utilizing vacuum chill cast methods. For example, smaller Be crystals made from hot pressed powders typically have a tensile strength of 30,000 to 40,000 psi. Higher tensile strength and more ductile Be metal composites are made by including small percentage of BeO (or other dispersed compounds) to create a cermet. The present invention utilizes unique methods of assembly, chemistry, and an excess of Be metal, to produce $Be/BeO/AmBe_{13}$ composite materials having useful properties such as good tensile strengths, toughness, resistance to oxidation, and which are monolithic and thus far less dispersible than current AmBe sources.

The present invention comprises a $Be/BeO/AmBe_{13}$ composite. However, $Be/BeO/AnBe_{13}$ composites also may be used, where An is understood to mean any element selected from the group of actinides. Other suitable alpha emitting actinide isotopes include, but are not limited to, $^{238}Pu$ and $^{244}Cm$. It is noted, however, that $^{239}Pu$ isotopic mixtures have a significantly lower alpha specific activity, which requires much larger sources to achieve a similar output.

The $Be/BeO/AmBe_{13}$ composite comprises crystals comprising BeO and $AmBe_{13}$ and an excess of beryllium. The weight ratio of Be:Am-containing reagent materials ($AmO_2$ or Am metal) materials is about 1:10 to about 1:100. In one embodiment, the crystals have a size (average diameter) of less than 2 μm, alternatively of less than 0.01 μm, and alternatively of from about 0.01 μm to about 2 μm. The crystals have a size distribution of about 2 μm, understood to mean that the size variation between individual crystals does not exceed about 2 μm. In theory, the crystals may approach the theoretical limit of a solid solution of $AmBe_{13}$ in the Be/BeO matrix, meaning that the $AmBe_{13}$ crystals approach the size of a single molecule, which increases neutron output efficiency compared to crystal sizes of 20 μm or more.

One method of forming the $AmBe_{13}$ intermetallic is from the two pure metals:

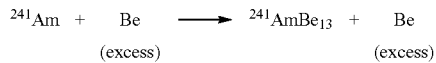

The above reaction is performed with induction heating and in a crucible. In one embodiment, the crucible is made of tantalum (Ta). One drawback of the above reaction is that $^{241}Am$ metal is more difficult to purify and to handle than other actinide metals such as Pu, thus is not readily available. Unlike Pu, Am has both a high melting point and high vapor pressure. Another drawback is that $^{241}Am$ metal is extremely reactive, and the finely divided material would be difficult to fabricate and pyrophoric. Pure metal source fabrication methods would utilize bulk Am metal, and the molten metals mixed in the induction furnace.

An alternative method of formation of $^{241}AmBe_{13}$ is by using $AmO_2$ and Be metal as starting materials:

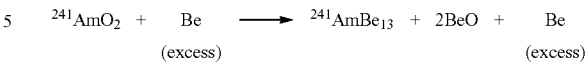

The above reaction also is performed with heating and in a crucible, preferably comprised of Ta. Thermodynamically, molten Be metal reacts with any metal oxide except BeO, $ThO_2$ and CaO. This reaction with $^{241}AmO_2$ is known to occur above the melting point of Be metal. One advantage of the above reaction is that $^{241}AmO_2$ and Be metal are more readily available in pure form. Fabrication from $^{241}AmO_2$ as a reagent produces BeO as a by-product, which may phase-separate from the Be metal, particularly after long time periods at high temperature and slow cool down periods. BeO has been utilized to strengthen Be metal composites in specific applications, thus it may prove advantageous in product source properties. A rapid cool down minimizes $^{241}AmBe_{13}$ crystal growth, Be metal crystal growth and phase separation. Other refractory materials like W, ZIRCALOY, or Pt30% Rh metal offer unique properties, and may be utilized instead of Ta to contain the high T melt.

Method of Making

The present invention further comprises a method of making a $Be/BeO/AmBe_{13}$ composite. In one embodiment, the $Be/BeO/AmBe_{13}$ composite may be made by casting. Products may be prepared from heating mixtures of varying ratios of $^{241}AmO_2$ (or bulk Am metal) and Be metal to a temperature ranging of from about 1400° C. to about 1600° C.). In one embodiment, the beryllium is present in a 7-fold to a 75-fold excess by weight of the amount of $AmBe_{13}$ Alternatively, the weight ratio of the Be metal to the $AmO_2$ powder or Am metal starting materials is from about 10:1 to about 100:1. Byproduct BeO (if $^{241}AmO_2$ is used) is generated by chemical reaction in the mixture. BeO in significant quantities has been shown to strengthen Be metal, and may prove advantageous in product source properties. The $AmBe_{13}$ would become insoluble and crystallize as molten bulk Be metal cools. Brief heating times and rapid cool down are believed to be important parameters to keep $AmBe_{13}$ crystals small and to minimize migration of Be and Am metals. Induction heating of the mixtures may be used to achieve brief heating, sufficient mixing, and rapid cool down. Alternatively, methods of imparting ultrasonic or acoustic energy for mixing may be used. Alternatively, the mixture may be quenched to provide rapid cool down.

One non-limiting example of a method of making the $Be/BeO/AmBe_{13}$ composite of the present invention comprises the following steps.

1. Place dry $AmO_2$ powder and Be metal powder in Ta capsule. For example, for a 10 Ci source at a 10:1 weight ratio of Be to $^{241}AmO_2$ add 33 g Be and 3.3 g $241AmO_2$.

2. Seal the Ta capsule by welding, optionally under vacuum.

3. Optionally, mix the powders in a shaker, an example being a high energy "ball mill" apparatus. In an alternative embodiment, Am metal may be used instead of $AmO_2$ powder, in which case mixing is not required.

4. Place the Ta capsule in an induction furnace.

5. Heat to a temperature of from about 1400° C. to about 1600° C. to initiate the chemical reaction to form $AmBe_{13}$ and BeO.

6. Hold at the above temperature for about 5 minutes, optionally monitoring neutron flux increase as verification of reaction progress.

7. Cool the temperature below the freezing point of the composite within about 5 minutes, optionally with external mixing during cool down. The cooling may occur in the induction furnace (minutes), or alternatively by a rapid quench method (cools in seconds).

8. The Ta capsule is then encased in additional layers of stainless steel and sealed by welding.

The above reaction should initiate at around the melting point of Be (1287° C.). An exothermic temperature spike associated with the formation of $AmBe_{13}$ has been observed raising the temperature to about 1800° C. (depending upon mass of excess Be). The length of time is important and should be brief (5 minutes) for the reaction to reach completion, followed by rapid cooling. Short reaction times and rapid cool down will minimize volatile migration of Am metal, improve neutron efficiency by keeping $AmBe_{13}$ crystals small, and improve composite strength properties by keeping Be and BeO crystals small.

The method of the present invention results in a Be/BeO/$AmBe_{13}$ composite having excellent tensile strength. "Tensile strength," as used herein, means the maximum stress a material can withstand without shearing, i.e. without exhibiting a break along a face of the crystalline material, and herein is expressed in units of psi (pounds per square inch). For the purposes of the present invention, the tensile strength may be determined as described in ASTM E8/E8M-08 Standard Test Methods for Tension Testing of Metallic Materials. The Be/BeO/$AmBe_{13}$ composites of the present invention have a tensile strength of at least 20,000 psi.

Method of Source Fabrication

The Be/BeO/$AmBe_{13}$ composite of the present invention may form part of a neutron source. One method of making a neutron source of the present invention is to place an amount of the desired reagent mixture of the present invention in a right circular cylinder of surface-oxidized tantalum as a crucible during the heating and cool down cycles as described above. In this manner, the source composite material may be formed in situ in a refractory metal crucible (nonlimiting examples of which include, Ta, W, ZIRCALOY, and Pt30% Rh), which would become the innermost sealed capsule for the neutron source. In one embodiment, the crucible comprises Ta. A lid may be welded on this metal crucible either before or after heating to create an innermost sealed capsule for the neutron source. The neutron source additionally may comprise one or more outer layers of welded stainless steel encasements which surround and enclose the innermost sealed capsule.

In all embodiments of the present invention, all percentages are by weight of the total composition, unless specifically stated otherwise. All ratios are weight ratios, unless specifically stated otherwise. All ranges are inclusive and combinable. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A neutron source comprising a composite, said composite comprising crystals comprising BeO and $AmBe_{13}$, and an excess of beryllium, wherein:
    a) the crystals have an average size of less than 2 microns;
    b) the size distribution of the crystals is less than 2 microns; and
    c) the beryllium is present in a 7-fold to a 75-fold excess by weight of the amount of $AmBe_{13}$.

2. The neutron source of claim 1, wherein the crystals have an average size of from about 0.01 micron to about 2 microns.

3. The neutron source of claim 1, wherein the composite is enclosed in a sealed capsule.

4. The neutron source of claim 3, wherein the sealed capsule comprises Ta, W, Zircaloy, or Pt30% Rh.

5. The neutron source of claim 4, wherein the sealed capsule is comprised of Ta.

6. A neutron source comprising a composite, said composite comprising crystals comprising BeO and $AmBe_{13}$ and an excess of beryllium, wherein the beryllium is present in a 7-fold to a 75-fold excess by weight of the amount of $AmBe_{13}$, and wherein the composite has a tensile strength of greater than 20,000 psi.

7. The neutron source of claim 6, wherein the crystals have an average size of from about 0.01 micron to about 2 microns.

8. The neutron source of claim 6, wherein the composite is enclosed in a sealed capsule.

9. The neutron source of claim 8, wherein the sealed capsule comprises Ta, W, Zircaloy, or Pt30% Rh.

10. The neutron source of claim 9, wherein the sealed capsule is comprised of Ta.

11. A method of producing a composite, said composite comprising crystals comprising BeO and $AmBe_{13}$ and an excess of beryllium, comprising:
    a) providing $AmO_2$ powder and Be metal powder in a sealed capsule, wherein the weight ratio of the Be metal to the $AmO_2$ powder is from about 10:1 to about 100:1;
    b) heating the mixed $AmO_2$ powder and Be metal powder in an induction furnace to a temperature of from about 1400° C. to about 1600° C. for a period of about 5 minutes; and
    c) lowering the temperature below the freezing point of the composite within about 5 minutes.

12. The method of claim 11, wherein the sealed capsule comprises Ta, W, Zircaloy, or Pt30% Rh.

13. The neutron source of claim 12, wherein the sealed capsule is comprised of Ta.

14. The method of claim 11, wherein the $AmO_2$ powder and the Be metal are intimately mixed prior to heating.

* * * * *